Patented May 27, 1924.

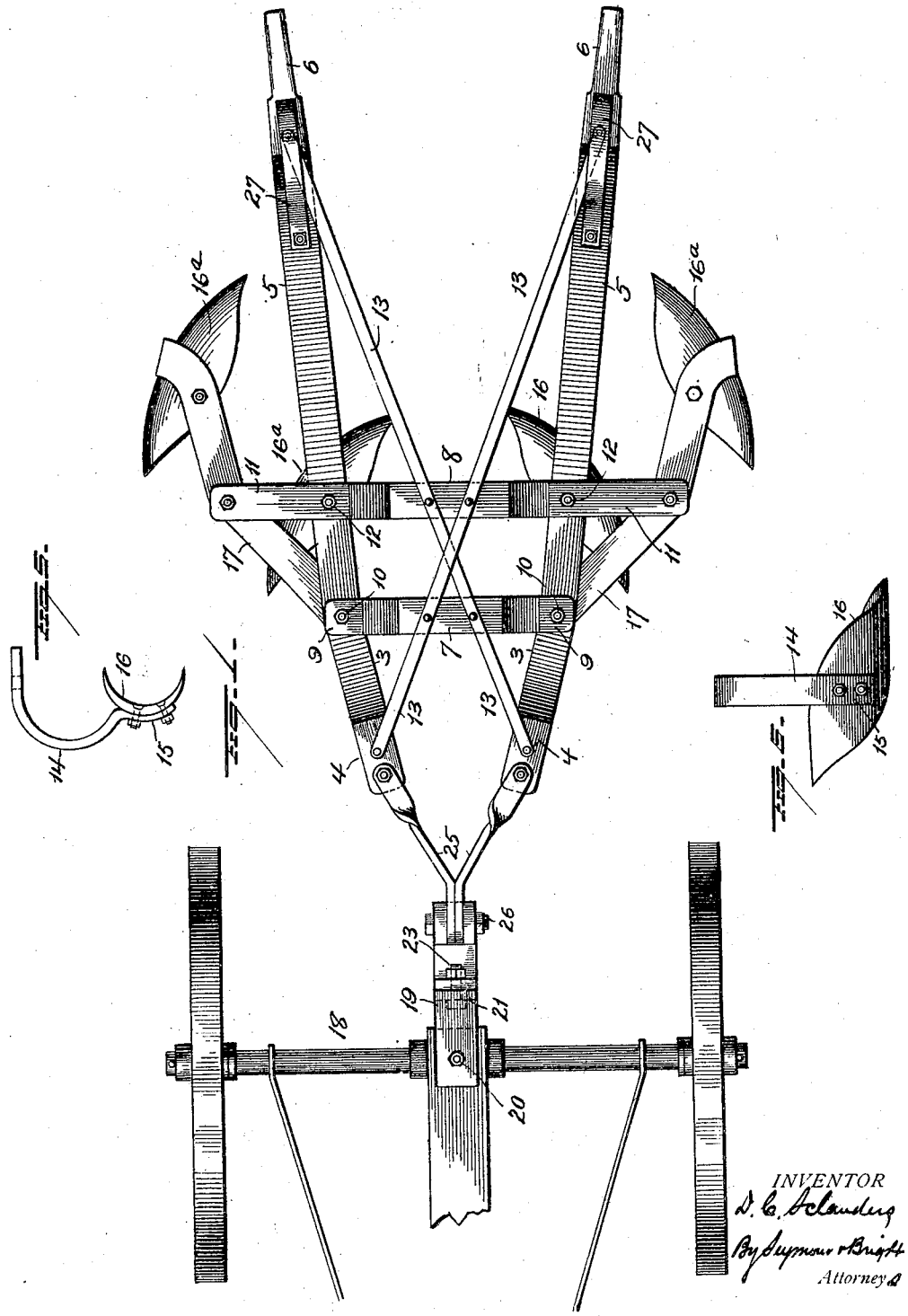

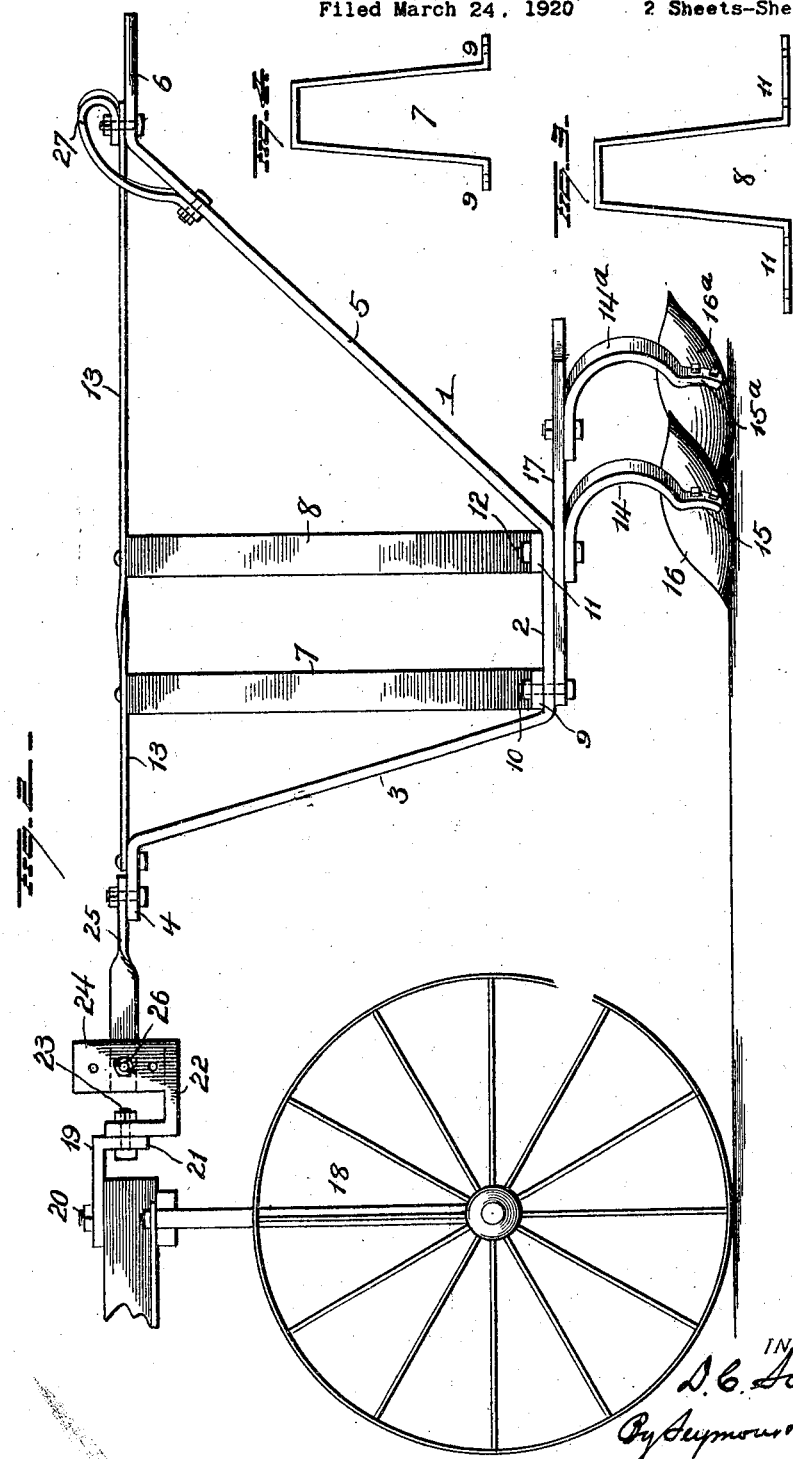

1,495,975

UNITED STATES PATENT OFFICE.

DOUGLAS CAMPBELL SCLANDERS, OF WEENEN COUNTY, NATAL, SOUTH AFRICA.

CULTIVATOR.

Application filed March 24, 1920. Serial No. 368,477.

*To all whom it may concern:*

Be it known that I, DOUGLAS C. SCLANDERS, a subject of Great Britain, residing at Weenen County, in the Province of Natal, Union of South Africa, have invented certain new and useful Improvements in Cultivators; and I do hereby declare the following to be a full, clear, and exact description of the invention, such as will enable others skilled in the art to which it appertains to make and use the same.

This invention relates to improvements in cultivators and more particularly to those of the "straddle-row" type,—one object of the invention being to so construct such a cultivator that it may be readily guided by the operator by reason of its pivotal connection with a wheeled draft frame or truck, and to so connect the cultivator frame with the latter that it may be adjustable vertically and so that the cultivator may be inverted and caused to be supported on runners which may travel over the ground when it is desired to transport the cultivator from place to place, as from one field to another or over a roadway.

A further object is to so construct a cultivator that certain of the shovels shall operate effectually to throw the soil toward the plants and cover weeds which may be adjacent to the latter and so that certain other shovels shall throw the soil in a direction to fill the furrows made by the first-mentioned shovels.

A further object is to so construct a straddle-row cultivator that it shall be strong and substantial and capable of successfully withstanding all strains to which it may be subjected.

With these and other objects in view, the invention consists in certain novel features of construction and combinations of parts as hereinafter set forth and pointed out in the claims.

In the accompanying drawings; Figure 1 is a plan view of a cultivator embodying my improvements; Figure 2 is a side elevation; Figure 3 is an edge view of the arch 7; Figure 4 is a similar view of the arch 8; Figure 5 is a side view of one of the shovels and its supporting standard, and Figure 6 is a rear view of a shovel and standard.

1, 1 represent longitudinal frame beams made approximately in the form of inverted arches having horizontal base portions 2 and forwardly inclined members 3, terminating in horizontal arms 4, and rearwardly inclined members 5 terminating in approximately horizontal arms forming handles 6.

The frame beams 1, 1 are suitably spaced apart and disposed at an acute angle relatively to each other, and their forward portions are connected by two transverse arches 7 and 8 approximately equal in height to the depth of the frame beams. The forward arch 7 is provided at its lower end with lateral arms 9 which are secured to the base portions 2 of the frame beams 1 by means of bolts 10. The rear arch is provided at its lower end with lateral arms 11 secured to the base portions 2 of the frame beams by bolts 12 and said arms 11 project laterally beyond the frame beams for a purpose hereinafter explained.

The frame beams and arches are connected by diagonal braces 13, each of which is connected at its forward end with one of the frame beams and at its rear end with the other frame beam,—the intermediate portions of said braces being secured to the tops of the arches 7 and 8.

Curved shovel standards 14 are secured to the frame beams at the juncture of the rear arch 8 therewith and provided at their lower ends with foot portions 15 which receive shovels 16 and to which said shovels are securely bolted. Lateral beams 17 are bolted to the frame beams at the juncture of the front arch 7 therewith and, extending laterally and rearwardly therefrom, are bolted to the outer end portions of the arms 11 of the rear arch. The lateral beams extend rearwardly from their connection with the arms 11 and have secured thereto, the upper ends of shovel standards $14^a$, the latter having seats $15^a$ to which rear shovels $16^a$ are secured. The shovels 16 are so disposed that they will operate to throw the soil toward the plants and cover any weeds which may be growing near the latter and the shovels $16^a$ are so set that they will throw the soil in a direction to fill the furrows made by the shovels 16.

A wheeled draft frame 18 is provided for and constitutes, in effect, a part of the cultivator structure,—said wheeled frame being constructed for attachment of draft animals or other draft means. A draft link or bar 19 is pivotally connected by a vertical bolt 20 with the wheeled frame and is provided at its rear end with a depending arm 21 to which one member of an approximately U-shaped coupling 22 is pivotally connected by means of a horizontal bolt 23, the pivotal connection at 23 being in line with the longitudinal axis of the cultivator frame. The other member (24) of the coupling is bifurcated to receive the forward ends of draw-bars 25,—the rear ends of the latter being connected with the forward ends of the respective frame beams 1, 1. The forward ends of the draw-bars 25 are connected with the coupling by means of a bolt 26, and the parallel portions of the bifurcated member 24 are provided with several aligning holes whereby the connection of the draw-bars with the coupling may be adjusted vertically.

The frame beams 1, 1, have secured thereto, near their rear ends, curved bars constituting runners 27 by which the cultivator may be supported on the ground when the same is inverted.

With my improvements, the cultivator can be easily guided by the operator, by reason of the pivotal connection at 20 with the wheeled frame and the cultivator may be raised and lowered by reason of the pivotal connection of the draw-bars 25 with the coupling 22 at 26.

When the cultivator is to be transported from field to field or over a road, it may be inverted,—turning on the pivotal connection at 23 with the draft link 19,—and the cultivator will then be supported at its rear end by the runners and at its forward end by the wheeled draft frame.

Various changes might be made in the details of construction of my invention without departing from the spirit thereof or limiting its scope and hence I do not wish to restrict myself to the precise details herein set forth.

Having fully described my invention what I claim as new and desire to secure by Letters Patent is:—

1. In a cultivator, the combination with beam frames comprising base portions and forwardly and rearwardly inclined members, transverse front and rear arches secured at their lower ends to the base portions of said beam frames, diagonal braces connecting said beam frames and arches, forward shovel standards secured to the beam frames and rear arch, forward shovels secured to said standards, the rear arch having arms projecting laterally from the beam frames, lateral beams secured to said beam frames and the arms of the rear arch and projecting rearwardly from said arms, shovel standards secured to said lateral beams, rear shovels secured to said last-mentioned standards, said forward shovels disposed to throw soil toward plants being cultivated and the rear shovels being disposed to throw soil to fill the furrows made by the forward shovels, and means for connecting the forward ends of the frame beams with draft means.

2. In a cultivator, the combination with beam frames comprising base portions and forwardly and rearwardly inclined members, transverse front and rear arches secured at their lower ends to the base portions of said beam frames, diagonal braces connecting said beam frames and arches, forward shovel standards secured to the beam frames and rear arch, forward shovels secured to said standards, the rear arch having arms projecting laterally from the beam frames, lateral beams secured to said beam frames and the arms of the rear arch and projecting rearwardly from said arms, shovel standards secured to said lateral beams, rear shovels secured to said last-mentioned standards, said forward shovels disposed to throw soil toward plants being cultivated and the rear shovels being disposed to throw soil to fill the furrows made by the forward shovels, and a coupling connecting the forward ends of the beam frames with a draft means, said coupling comprising members permitting inversion of the cultivator frame.

In testimony whereof, I have signed this specification in the presence of two subscribing witnesses.

DOUGLAS CAMPBELL SCLANDERS.

Witnesses:
OTTO M. ALLISON,
J. R. CURRIE.